Sept. 27, 1960 B. OSTENDORF, JR 2,954,487

CHARACTER TIMING IMPULSE CIRCUIT FOR TELEGRAPH RECEIVER

Filed Sept. 11, 1958 2 Sheets-Sheet 1

INVENTOR
B. OSTENDORF, JR.
BY
John E. Cassidy
ATTORNEY

Sept. 27, 1960 B. OSTENDORF, JR 2,954,487

CHARACTER TIMING IMPULSE CIRCUIT FOR TELEGRAPH RECEIVER

Filed Sept. 11, 1958 2 Sheets-Sheet 2

INVENTOR
B. OSTENDORF, JR.
BY
John E. Cassidy
ATTORNEY

United States Patent Office 2,954,487

Patented Sept. 27, 1960

2,954,487

CHARACTER TIMING IMPULSE CIRCUIT FOR TELEGRAPH RECEIVER

Bernard Ostendorf, Jr., Stamford, Conn., assignor to Bell Telephone Laboratories, Incorporated, New York, N.Y., a corporation of New York Filed Sept. 11, 1958, Ser. No. 760,497

8 Claims. (Cl. 307—88.5)

Figure 1:
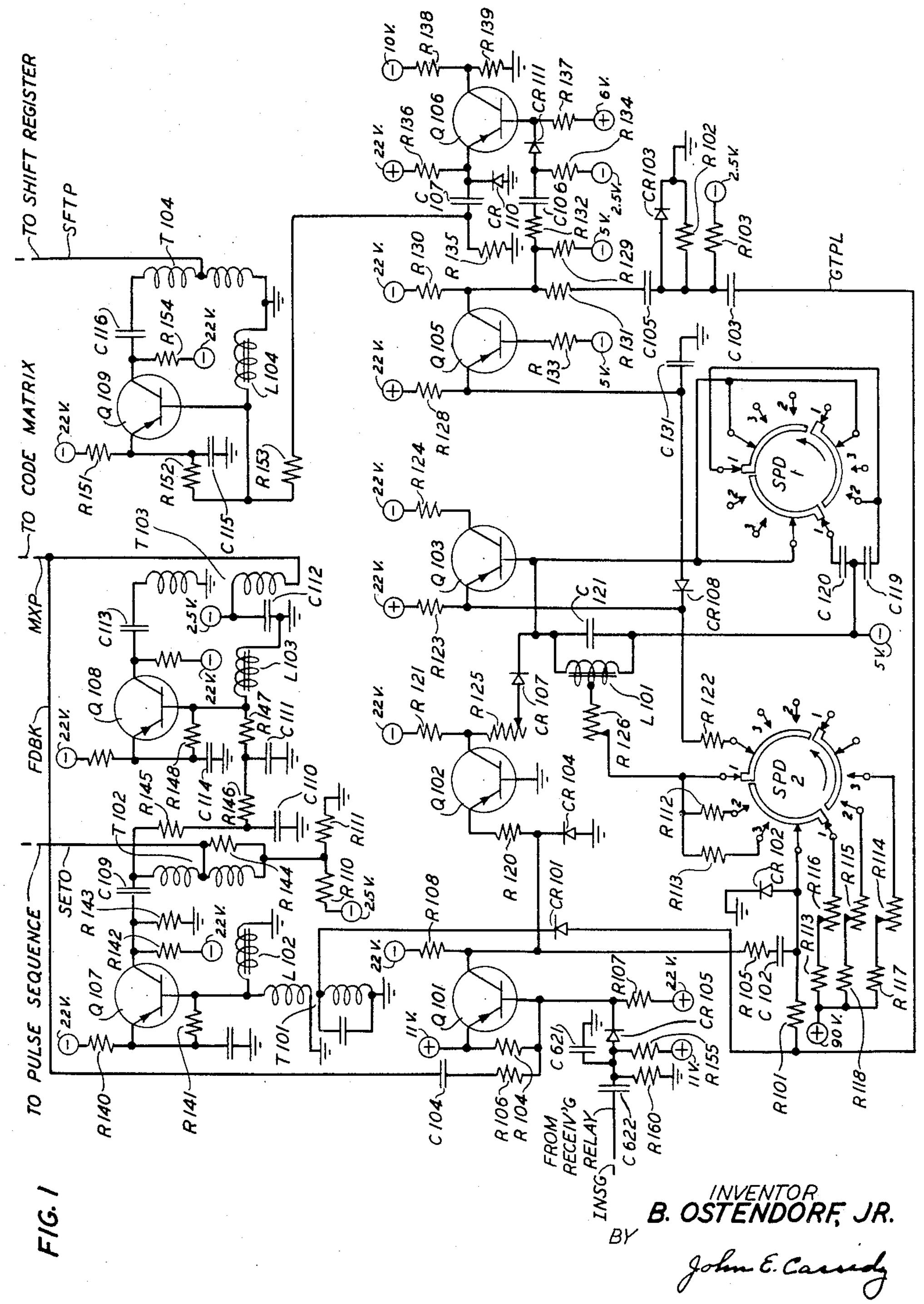

This invention relates to a permutation code signal character timing circuit and more particularly to a start-stop oscillator for generating timing pulses for permutation code signals.

In the copending application of J. P. Mahony, B, Ostendorf, Jr., G. Parker and R. A. Vanderlippe, Serial No. 760,510, filed concurrently herewith, there is described an outlying station on a multistation line selectively responsive to control signals from a remote control station. The receiving side of the outlying station circuit includes a director circuit which functions to register received multielement two-condition start-stop permutation code signal combinations, or teletypewriter characters as they will be termed hereafter, requiring selective action on the part of the outlying station. This receiving side of the circuit combines successive registrations to form significant sequences and directs other parts of the station circuit in the performance of the selective action indicated by these sequences. The timing of the functions of the direct circuit is controlled by a character timer circuit which generates character and element pulses for each received teletypewriter character. In a preferred embodiment, the present invention provides a character timer circuit that may be incorporated in a station similar to the type disclosed in the above-mentioned Mahony et al. application.

A broad object of this invention is to provide a pulse generator whose operation is started by an input signal and stopped by feeding back one of its generated pulses.

Another object of this invention is to provide a start-stop oscillator whose operation is stopped by feeding back an output pulse to the oscillator controlling means after the oscillator has been operating for a predetermined interval of time.

A further object of this invention is to provide an oscillator feedback circuit which is disassociated from the oscillator for a predetermined interval of time after the initiation of the operation of the oscillator.

Prior start-stop oscillators have been arranged to feed output pulses to control circuits which stop the operation of the oscillator after a predetermined number of pulses have been generated. This has required the employment of complex counting circuits including a plurality of discharge devices. In accordance with the present invention, the oscillator is stopped by feeding back a predetermined pulse via a feedback circuit which is disabled for a predetermined interval of time after the initiation of the operation of the oscillator. This is accomplished by employing a gate circuit in the feedback circuit and a timing circuit which operates to block the gating action of the gate circuit when an incoming code signal starts the oscillator.

In a preferred embodiment of the present invention, the character timer includes an oscillator or pulse generator, a bistable circuit which enables or disables the pulse generator in accordance with the state of the bistable circuit, a gate circuit which feeds back the output pulses of the pulse generator to the bistable circuit and a timing circuit which controls the action of the gate circuit. The bistable circuit is operated to a first stable state in response to an incoming code signal enabling the pulse generator and initiating the operation of the timing circuit which, in turn, blocks the gate circuit. When the timing circuit times out, the gate circuit is unblocked and applies a generated pulse to the bistable circuit operating the bistable circuit to the second stable state and thereby disabling the pulse generator.

Figure 2:
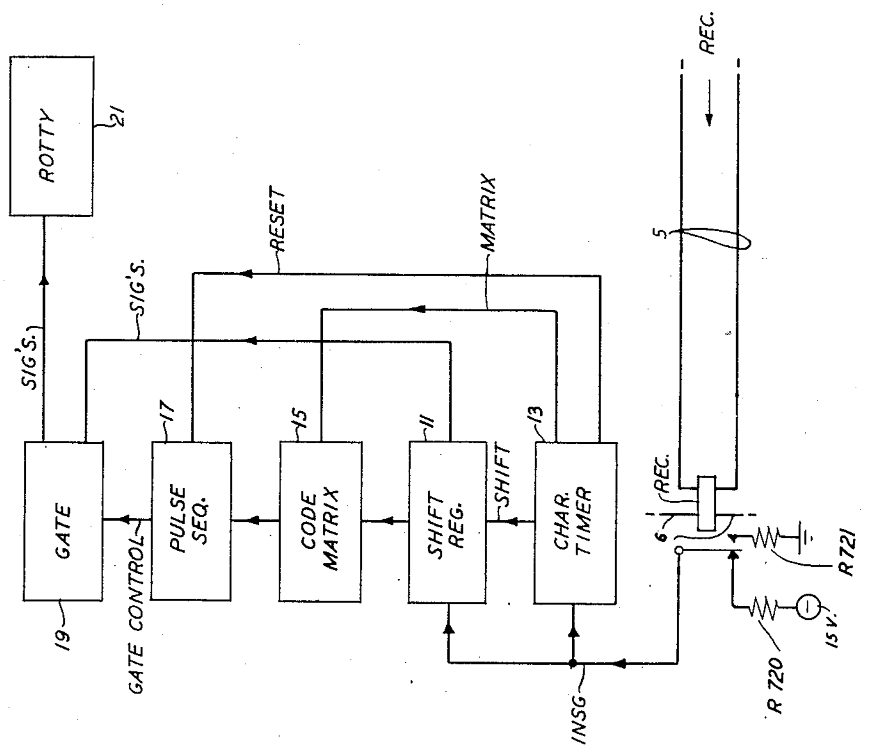

A more complete understanding of the foregoing objects and features of this invention may be had from the following description, taken in conjunction with the accompanying drawings wherein:

Fig. 1 shows the details of the circuits and equipment which form the preferred embodiment of this invention; and Fig. 2 illustrates in block form the layout of the receiving side of a typical automatic station circuit and the manner in which the present invention cooperates with the various component circuits in the station.

Referring now to Fig. 2, start-stop permutation code signals from a remote station are received over receiving channel 5 by receiving relay REC. The receiving relay REC may be biased in any well-known manner, as for example by bias winding 6, for the reception of open and close signals or polar signals. When receiving channel 5 is in the idle marking condition the relay armature rests on a back contact and connects a source of −15 volt potential, for instance, input signals lead INSG via resistor R720; when relay REC is operated to spacing in accordance with input signals, lead INSG is connected to ground potential by way of a front contact and resistor R721. It is to be understood that the various constants of the potential sources referred to in the disclosure are by way of example only and can be readily varied in accordance with the constants of the circuit parameters.

Lead INSG applies the relayed line signals to character timer circuit 13, which is the feature of this invention, and shift register 11 which stores the received code characters. Character timer 13 initiates a timing cycle each time the start pulse of a code character is received supplying pulses during the timing cycle to shift register 11 to shift the received code elements to successive stages of shift register 11. With the information code elements of the received character stored in shift register 11, character timer 13 sends a matrix pulse to code matrix 15. Code matrix 15, which contains the directory information for the station, employs the matrix pulse to read the character stored in shift register 11 and supplies pulse sequence circuit 17 with the translated information. The function of pulse sequence circuit 17 is to sample the translated information and, if the received character or characters require any action by the station, to relay instructions in accordance therewith to gate circuit 19. On receipt of the next character, character timer 13 resets pulse sequence circuit 17 and supplies the shift pulses to store the next character in shift register 11 and shift the code elements of the preceding character to the last stage of shift register 11 where they are relayed to receiving-only teletypewriter 21 by way of gate circuit 19 which now blocks or passes the signals in accordance with the instructions of pulse sequence circuit 17 which has previously sampled the translated information derived from the preceding character. Receiving-only teletypewriter 21 may be of any suitable type of telegraph recorder such as a page printer preferably of the type disclosed in Patent 1,904,164 granted to S. Morton et al. on April 18, 1933. The disclosure of this patent is incorporated herein by reference. The operation of shift register 11, code matrix 15, pulse sequence circuit 17 and gate circuit 19 is described in detail in the above-mentioned Mahony et al. application.

Unless otherwise indicated as the PNP type described in Patent 2,569,347, granted to W. Shockley on September 25, 1951, the transistors hereafter described are of the point-contact P-type similar to the type described in Patent 2,524,035 granted to J. Bardeen and W. H. Brittain on October 3, 1950. Single units of point contact transistors are used to provide bistable flip-flop circuits or monostable one-shot or timing circuits similar to the type of circuits disclosed in Patent 2,708,720 granted to A. E. Anderson on May 17, 1955 and in the applications of A. J. Rack, Serial No. 79,861, filed March 5, 1949 and B. Ostendorf, Jr., Serial No. 292,875, filed June 11, 1952 which issued as Patent 2,831,983 on April 22, 1958. The above-mentioned patents and applications are hereby incorporated herein by reference.

In general, emitter and collector current flows when the emitter potential is positive relative to the base potential and this condition is referred to in the following description as ON. When the emitter potential is negative relative to the base potential, only negligible collector current flows due to collector-to-base leakage and this condition is referred to as OFF.

Assuming a condition in which the transistor is OFF, if a resistance is inserted in series with the base, the base voltage becomes less positive relative to the emitter due to the leakage current and as the base resistance is further increased, the base potential eventually becomes slightly negative with respect to the emitter and the device triggers itself to the ON condition. If the base resistance is now descreased from this maximum level, the base potential will remain negative relative to the emitter potential due to the increased base current while the circuit is in the ON condition. At some minimum point, however, a further decrease in the base resistance will cause the base voltage to rise to a point at which the emitter is cut off and the circuit goes into the OFF condition.

It is thus seen that the circuit meets the requirements for either the ON or OFF condition for base resistor values between the above-described maximum and minimum levels and is therefore stable in either state. External trigger pulses may be applied to the base or emitter to cause the circuit to flip back and forth between the two states.

The monostable circuit and the monostable timing circuit use the principles of the bistable circuit, except that one of the two states is a temporary condition. The monostable circuit is normally in the OFF condition, with the emitter biased slightly negative. The circuit is monostable in that it is externally triggered to the ON condition but after a time interval self-triggers to the OFF condition. Self-triggering to the OFF condition is caused by supplying the emitter current via a series capacitor and/or supplying the base current via a series inductor whereby the emitter current falls and the base current rises during the ON interval.

When these effects have progressed to the point at which the ratio of collector to emitter current equals the current multiplication ratio of the particular transistor the circuit is on the verge of triggering to OFF. At this point even a slight additional decrease in emitter current results in a sudden decrease of collector current to the residual collector-to-base leakage. It should be noted that near the point of self-trigger to OFF, the ratio of collector to emitter current is changing rather rapidly; hence the timed interval is not greatly affected by variations in the current multiplication ratio beween transistors. The duration of the pulse is controlled largely by the size of the emitter capacitor and of the base inductor.

The circuit also functions with a resistor in place of the base inductor or with the emitter grounded and retaining the base inductor. In both of the latter cases the pulse duration is somewhat less predictable.

The monostable timing circuit differs from the monostable circuit insofar as the monostable circuit is normally in the OFF condition, while the timing circuit is normally in the ON condition.

Operation of the timing circuit depends on a diode which holds the emitter slightly positive with respect to the base in the ON condition of the circuit. When the circuit is turned OFF by trigger input, the base quickly goes positive and stops the emitter current. The diode in the emitter becomes effectively an open circuit and leaves nothing connected to the emitter but the capacitor and high resistance charging circuit to a positive battery supply. When the capacitor voltage reaches the base voltage the circuit times out to the ON condition.

It is particularly pointed out that the teletypewriter character which is turned by the present circuit comprises a start signal element, which is always a spacing signal element and a stop signal element which is always a marking signal element. Intermediate thereto are the intelligence elements, usually five, which may be marking or spacing in all permutations.

Referring to Fig. 1, the relayed line signals on lead INSG are presented to the base of bistable transistor Q101 by way of capacitor C622 and varistor CR105 which, due to its connection to the junction of resistors R160 and R155 connected to ground and +11 volt supply respectively, for instance, is biased to block negative-going marking signals and pass positive-going spacing signals. Shunting capacitor C621 is connected to the junction of capacitor C622 and varistor CR105 to filter out currents caused by any relay chatter.

In the idle marking condition, transistor Q101 is ON and the collector voltage is relatively positive. This condition is applied to the emitter of direct-current transistor amplifier Q102 by way of resistor R120. Since the base of transistor Q102 is grounded the transistor is thus made strongly conductive and causes a current flow from the collector of transistor Q102 through inductor L101 to a −5 volt source, for instance, by way of varistor CR107 and potentiometer R125. This has two effects on the tuned circuit of which inductor L101 and capacitor C121 are a part:

(1) The lower impedance formed by transistor Q102 and the resultant current flow through inductor L101 prevent oscillations from building up in the tuned circuit.

(2) The actual current flow represents the starting point of the oscillating cycle of the tuned circuit when the oscillation stop condition is removed by cutting off transistor Q102.

Starting from the idle condition, or the stop condition, which is the marking condition, the spacing-start element of the next received code signal combinations will transmit a positive-going pulse to the base of transistor Q101 triggering the transistor OFF. Once triggered OFF transistor Q101 remain OFF until triggered to ON by a pulse from the matrix pulse amplifier, monostable transistor Q108. This action is described in a following paragraph.

When transistor Q101 is triggered OFF at the beginning of the start element of the teletypewriter character, the resulting negative-going change in the voltage at its collector terminal is held or limited to a slightly negative voltage due to the holding effect of varistor CR104. This condition is applied to the emitter of transistor Q102 via resistor R120 turning OFF the transistor, thus causing a drop of the collector voltage of transistor Q102 to a negative value sufficient to cut off the current flow through varistor CR107. In addition, the fixed negative-going change of the collector of transistor Q101, as determined by the holding or limiting action of varistor CR104, is applied to capacitor C102 via resistor R105, setting up a negative charge for capacitor C102 and thereby applying cut-off bias to varistor CR101 via resistor R101 to block any pulses from passing therethrough. Clamping varistor CR102, connected between the junction of capacitor C102 and resistor R101 and ground, supplies a low impedance path to ground for positive-going voltage changes from the collector of transistor Q101 when it is turned ON and determines the charge on capacitor C102 prior to the application of the negative-going voltage change from the collector or transistor Q101.

The circuit arrangement of PNP transistor Q103 is that of an emitter-follower having a voltage gain of approximately unity and a current gain the order of 20 or more. The emitter voltage closely follows the voltage input to the base which is based on the −5 volt supply to the tuned circuit and the oscillating voltage across the tuned circuit. Feedback path from the emitter of transistor Q103 to the center tap of inductor L101 via resistor R122, section 2 of manually operated switch SPD including resistor R112 or R113 for 75 or 100 speed operation and potentiometer R126 supplies in-phase aiding current to inductor L101 to maintain oscillations in the tuned circuit. Potentiometer R126 may be adjusted to maintain constant amplitude oscillations in the tuned circuit.

With transistor Q102 cut off, cutting off the current flow through varistor CR107, an oscillatory condition is established for the tuned circuit and its associated PNP transistor Q103. The oscillations start from nearly zero voltage across the tuned circuit beginning with the negative half cycle. The frequency of oscillation is manually controlled by two sections, three-position switch SPD which determines the 60, 75, or 100 speed of operation when operated to positions 1, 2, or 3, respectively, by adding capacitors C119 and C120 in shunt to the tuned circuit via section 1 of switch SPD.

Oscillation continues at the rate of one cycle per teletypewriter signal element until transistor Q101 is again restored to the ON condition and transistor Q102 cut ON reestablishing the holding curren through inductor L101 by way of potentiometer R125 and varistor CR107.

The circuitry associated with direct-current transistor amplifier Q105 makes it normally conductive except when held non-conducting during the negative half cycles by a negative lamp on the emitter derived from the emitter voltage of transistor Q103 by way of varistor CR108. As the emitter voltage of transistor Q103 passes in a positive-going direction, through −5 volts, for instance, which is the assumed potential of the base of transistor Q103 varistor CR108 becomes back biased, removing the negative clamp, and transistor Q105 is made suddenly conductive by positive voltage applied to its emitter by the +22 volt supply, for instance, through resistor R128 producing a positive-going change in the collector voltage. Since the oscillations start with the negative half-cycle and are based on −5 volts supply to inductor L101, the positive-going change at the collector of transistor Q105 occurs at the center of each cycle of oscillation.

The positive-going change in the collector voltage of transistor Q105 is applied to monostable timing transistor Q106 via resistor R132, capacitor C106 and varistor CR111 and is passed via resistor R131 to a limiting and differentiating network comprising series capacitors C105 and C103, shunting varistor CR103 and shunting resistors R102 and R103 and the resulting pulse or pip is applied to the primary winding of transformer T101 via lead GTPL and varistor CR101 which is blocked as previously described. Since resistors R102 and R103 are connected to ground and −2.5 volt supply, respectively, and varistor CR103 is connected to ground, the excursion of the pulse or pip is fixed between a base voltage level determined by the voltage divider formed by resistors R102 and R103 and an upper voltage level determined by the limiting action of varistor CR103. This limiting action insures that the peak of the pulse will not be passed by varistor CR101 when it is blocked, as previously described.

Transistor Q105 is clamped to the OFF condition by way of varistor CR108 shortly after the oscillation goes into the next negative half cycle. This clamping point is not critical since the negative-going change at the collector of transistor Q105 is not used.

As previously described, varistor CR101 is back-biased by the negative-going change from transistor Q101 as fixed by varistor CR104, when the transistor is turned OFF, blocking the positive-going pulses or pips derived from the collector of transistor Q105. Capacitor C102, however, immediately starts to charge toward the cut-on point of varistor CR101 from +90 volt supply for instance by way of section 2 of switch SPD and one of the timing resistors R117, R118 or R119 and the associated potentiometer R114, R115 or R116. The adjustment of this charging circuit is such that the seventh positive-going pulse derived from the collector of transistor Q105 is passed by varistor CR101 into the primary winding of transformer T101 and a resultant negative-going pulse from the secondary winding of transformer T101 is applied to the base of monostable transistor Q107 triggering the transistor to the ON condition. Transistor Q107 remains ON for about 15 microseconds and then self-triggers to OFF. When transistor Q107 turns ON, the positive-going pulse from the collector is passed through capacitor C109 causing a current pulse through the windings of autotransformer T102 to the junction of the voltage divider formed by resistors R110 and R111. This applies a positive-going reset pulse to lead SETO connected to the junction of the windings of autotransformer T102. Resistor R144 is connected in shunt to the autotransformer winding connected to the junction of resistors R110 and R111 to dampen any ringing current.

When transistor Q107 self-triggers to OFF, the resultant negative transition of the collector voltage is applied by way of capacitor C109, the delay network comprising series resistors R145 and R146 and shunting capacitors C110 and C111 and resistor R147 to the base of monostable transistor Q108, causing it to turn ON. Transistor Q108 remains ON for about ten microseconds and then self-triggers to OFF. The positive-going pulse from the collector of transistor Q108, as it is triggered to ON, is passed through condenser C113 causing a current pulse through the primary winding of pulse transformer T103 to ground. This in turn applies a negative-going pulse from the secondary winding of transformer T103 to the matrix pulse lead MXP and to the base of transistor Q101 via lead FDBK, capacitor C104 and resistor R106. Transistor Q101 is thus restored to the ON condition in preparation for timing the next character.

Transistor Q106 is triggered to OFF by the positive pulses from the collector of transistor Q105. Transistor Q106 remains OFF for approximately 75 microseconds while capacitor C107 charges via resistor R136. When the emitter of transistor Q106 reaches the base potential of approximately +3 v., transistor Q106 self-triggers to ON, producing a negative-going transition at the emitter which is differentiated by capacitor C107 and shunting resistor R135 and the resultant negative-going pulse is applied to the base of monostable transistor shift pulse amplifiers Q109 via resistor R153. The negative pulse at the emitter of transistor Q106, applied to the base of transistor Q109, turns transistors Q109 ON producing a positive-going pulse at the collector which is passed through capacitor C116, causing a current pulse to ground through the windings of autotransformer T104. This results in a positive-going shift pulse on leads SFTP which is connected to the junction of the windings of autotransformer T104. Transistor Q109 self-triggers to OFF after approximately 30 microseconds.

It should be noted that during the character timing cycle various pulses such as the shift, reset and matrix pulses are generated. The purpose of these pulses is more fully explained in the above-mentioned Mahony et al. application.

It is understood that the detailed description of a specific embodiment of the invention is by way of illustration and it is not intended that the invention should be considered as limited to such specific embodiment but capable of modification without departing from the spirit of the invention and within the scope of the appended claims.

What is claimed is:

1. A start-stop oscillator comprising a bistable circuit, an input circuit for triggering said bistable circuit in response to an input signal, a pulse generator activated by said triggered bistable circuit for generating pulses, a feedback circuit responsive to said generated pulses for resetting said triggered bistable circuit, and a timing circuit operated by said triggered bistable circuit for disabling said feedback circuit.

2. A start-stop oscillator comprising a bistable circuit triggered by an input signal, a pulse generator responsive to said triggered bistable circuit for generating pulses, a feedback circuit responsive to the application of one of said generated pulses thereto for resetting said triggered bistable circuit, a timing circuit operably responsive to the triggering of said bistable circuit for providing a timing interval and a gate circuit responsive to the operation of said timing circuit at the end of the timing interval for applying said generated pulses to said feedback circuit.

3. A start-stop oscillator for generating element timing pulses equal in number to the elements of incoming start-stop permutation code signals comprising a pulse generator for generating element timing pulses, a bistable circuit for disabling said pulse generator, an input circuit for disabling said bistable circuit in response to the start element of an incoming start-stop permutation code signal, a delay circuit for enabling said bistable circuit in response to the application of one of said timing pulses to said delay circuit, a diode gate circuit for applying said timing pulses to said delay circuit and a timing circuit responsive to the disabling of said bistable circuit for applying blocking bias to said diode gate circuit.

4. A start-stop oscillator for generating element timing pulses equal in number to the elements of incoming start-stop permutation code signals comprising an input circuit conditioned by the start element of an incoming start-stop permutation code signal, a pulse generator responsive to said conditioned input circuit for generating element timing pulses, a timing circuit operably responsive to the conditioning of said input circuit for providing a timing interval, a feedback circuit responsive to the application of one of said generated pulses thereto for deconditioning said input circuit and a gate circuit responsive to the operation of said timing circuit at the end of the timing interval for applying said generated pulses to said feedback circuit.

5. A start-stop oscillator for generating N element timing pulses equal in number to the elements of each incoming start-stop permutation code signal comprising a bistable circuit, an input circuit responsive to the start element of an incoming start-stop permutation code signal for setting said bistable circuit, a pulse generator responsive to said set bistable circuit for generating element timing pulses, a delay circuit, a gate circuit for applying said generated timing pulses to said delay circuit, a feedback circuit responsive to said pulsed delay circuit for resetting said bistable circuit and a timing circuit responsive to the setting of said bistable circuit for applying blocking bias to said gate circuit for a predetermined duration substantially equal to the duration required for the generation of N–1 of said generated pulses.

6. A start-stop oscillator for generating a predetermined number of pulses in response to an incoming code signal comprising a pulse generator for generating pulses, a trigger circuit having two stable states, an input circuit for setting said trigger circuit in one of said two stable states in response to said incoming code signal, a timing circuit responsive to the setting of said trigger circuit in said one state for providing a timed interval, a delay circuit, a gate circuit responsive to said timing circuit at the conclusion of said timed internal for applying said generated pulses to said delay circuit, a feedback circuit responsive to said pulsed delay circuit for resetting said trigger circuit to the other of said two stable states and a generator control circuit responsive to said trigger circuit in said other state for disabling said pulse generator.

7. A start-stop oscillator for generating a predetermined number of pulses in response to an input signal comprising a bistable circuit set in one of two stable states in response to said input signal, a pulse generator, a pulse generator feedback circuit operable in response to a pulse generated by said pulse generator for resetting said bistable circuit in the other of said stable states, a timing circuit responsive to the setting of said bistable circuit in said one state for disassociating said pulse generator from said feedback circuit for a predetermined interval of time and a control circuit responsive to said bistable circuit in said other state for preventing the operation of said pulse generator.

8. A start-stop oscillator for generating a predetermined number of pulses in response to the start signal of an incoming permutation code signal comprising a pulse generator responsive to said start signal for generating a train of pulses, a pulse generator feedback circuit operable in response to each of said generated pulses for disabling said pulse generator and a timing circuit responsive to said start signal for disassociating said pulse generator and said feedback circuit for a predetermined interval of time.

References Cited in the file of this patent

UNITED STATES PATENTS 2,475,625 Lyons ________________ July 12, 1949